(12) United States Patent
Kojima et al.

(10) Patent No.: US 10,541,437 B2
(45) Date of Patent: Jan. 21, 2020

(54) FUEL CELL SYSTEM, CONTROL METHOD OF FUEL CELL SYSTEM, AND FUEL CELL CONTROL APPARATUS

(71) Applicant: KYOCERA Corporation, Kyoto-shi, Kyoto (JP)

(72) Inventors: Masaya Kojima, Kawasaki (JP); Yasunori Komada, Ome (JP)

(73) Assignee: KYOCERA Corporation, Kyoto (JP)

( * ) Notice: Subject to any disclaimer, the term of this patent is extended or adjusted under 35 U.S.C. 154(b) by 624 days.

(21) Appl. No.: 15/122,104

(22) PCT Filed: Feb. 26, 2015

(86) PCT No.: PCT/JP2015/001011
§ 371 (c)(1),
(2) Date: Aug. 26, 2016

(87) PCT Pub. No.: WO2015/129277
PCT Pub. Date: Sep. 3, 2015

(65) Prior Publication Data
US 2017/0149076 A1 May 25, 2017

(30) Foreign Application Priority Data
Feb. 26, 2014 (JP) .................................. 2014-036012

(51) Int. Cl.
*H01M 8/04701* (2016.01)
*H01M 16/00* (2006.01)
(Continued)

(52) U.S. Cl.
CPC ..... *H01M 8/04701* (2013.01); *H01M 8/0494* (2013.01); *H01M 8/04228* (2016.02);
(Continued)

(58) Field of Classification Search
CPC ......... H01M 8/04701; H01M 8/04228; H01M 8/04303; H01M 8/04253; H01M 8/04388;
(Continued)

(56) References Cited

U.S. PATENT DOCUMENTS 6,420,060 B1   7/2002   Yamamoto et al.
6,893,758 B2   5/2005   Miyazawa et al.
(Continued)

FOREIGN PATENT DOCUMENTS

JP   2000-340244 A   12/2000
JP   2013-200273 A    3/2001
(Continued)

OTHER PUBLICATIONS

JP 2012-216412 Machine Translation.*
(Continued)

*Primary Examiner* — Amy Cohen Johnson
*Assistant Examiner* — Paul D Baillargeon
(74) *Attorney, Agent, or Firm* — Procopio Cory Hargreaves and Savitch LLP

(57) ABSTRACT

In order to provide means to improve an operating ratio and the like of a fuel cell while keeping using a gas meter and a gas leakage detection system popularly used by a general household, a fuel cell system of the disclosure herein including a fuel cell module configured to generate power by using gas supplied via a gas meter and a controller configured to control the power generation of the fuel cell module, wherein the controller, when detecting for a first predetermined period of time that the gas is not supplied to anything else other than the fuel cell module, controls to stop the power generation of the fuel cell module for a second predetermined period of time.

18 Claims, 6 Drawing Sheets

(51) Int. Cl.
| | |
|---|---|
| *H01M 8/04223* | (2016.01) |
| *H01M 8/0438* | (2016.01) |
| *H01M 8/04303* | (2016.01) |
| *H01M 8/04228* | (2016.01) |
| *H01M 8/12* | (2016.01) |
| *H01M 8/124* | (2016.01) |
| *H01M 8/04828* | (2016.01) |

(52) U.S. Cl.
CPC ... *H01M 8/04253* (2013.01); *H01M 8/04303* (2016.02); *H01M 8/04388* (2013.01); *H01M 8/12* (2013.01); *H01M 16/006* (2013.01); *H01M 2008/1293* (2013.01); *H01M 2220/10* (2013.01)

(58) Field of Classification Search
CPC .... H01M 8/0494; H01M 8/12; H01M 16/006; H01M 2008/1293; H01M 2220/10; H01M 2220/20
See application file for complete search history.

(56) References Cited

U.S. PATENT DOCUMENTS

| | | | |
|---|---|---|---|
| 8,357,473 B2 | 1/2013 | Ikezoe | |
| 2004/0081870 A1 | 4/2004 | Miyazawa et al. | |
| 2008/0020246 A1 | 1/2008 | Ikezoe | |

FOREIGN PATENT DOCUMENTS

| | | |
|---|---|---|
| JP | 2003-151601 A | 5/2003 |
| JP | 2005-269823 A | 9/2005 |
| JP | 2006-156085 A | 6/2006 |
| JP | 2011-119090 A | 6/2011 |
| JP | 2011-175816 A | 9/2011 |
| JP | 2012-216412 A | 11/2012 |
| KR | 10-2007-0010988 A | 1/2007 |

OTHER PUBLICATIONS

JP 2011-119090 Machine Translation.*
International Search Report dated Mar. 31, 2015 issued by the Japanese Patent Office for international Application No. PCT/JP2015/001011.
Extended European Search Report dated Sep. 13, 2017, issued by the European Patent Office in counterpart European Patent Application No. 15 755745.5.
Written Opinion of the International Searching Authority issued by Japan Patent Office for International Application No. PCT/JP2015/001011.

* cited by examiner

FUEL CELL SYSTEM, CONTROL METHOD OF FUEL CELL SYSTEM, AND FUEL CELL CONTROL APPARATUS

CROSS REFERENCE TO RELATED APPLICATION

This application claims priority to and the benefit of Japanese Patent Application No. 2014-36012 filed on Feb. 26, 2014, the entire contents of which are incorporated herein by reference.

TECHNICAL FIELD

This disclosure relates to a fuel cell system, a control method of the fuel cell system, and a fuel cell control apparatus.

BACKGROUND

Conventionally, in order to perform gas leakage detection during a stable operation of a fuel cell, the operation of the fuel cell is completely stopped for, for example, one day in a certain period of time (e.g., 30 days). That is, by stopping the fuel cell for one day, a period of time in which a total gas use amount of the fuel cell and gas appliances becomes zero is intentionally generated so as to allow for the gas leakage detection. Therefore, an operating ratio and a power generation efficiency of the fuel cell may possibly decrease.

Especially in using a solid oxide fuel cell, a battery cell needs to be cooled down when the cell is stopped. Therefore, it takes time to restart power generation after stopping the fuel cell, possibly further deteriorating the operating ratio of the fuel cell.

For example, PLT 1 set forth below describes a method of using a gas meter having a fixed amount gas flow path for supplying gas to the fuel cell and a variable amount gas flow path for supplying gas to gas appliances. This method detects the presence/absence of the gas leakage by using a sensor provided on a downstream side in the variable amount gas flow path.

CITATION LIST

Patent Literature

PLT 1: JP-A-2013-200273

SUMMARY

Technical Problem

Currently, however, when gas is provided to general households, a total gas flow rate used in one household is measured. Accordingly, reconstruction of a system for the gas leakage detection by separating the gas flow path into branches within the gas meter and providing a sensor to one of the paths incurs high cost.

Therefore, it could be helpful to provide an expedient to improve the operating ratio of the fuel cell while keeping using the gas meter and a gas leakage detection system which are popularly used by the general households.

Solution to Problem

A fuel cell system according to embodiments of the disclosure herein is a fuel cell system having a fuel cell module configured to generate power by using gas supplied via a gas meter and a controller configured to control power generation of the fuel cell module, wherein the controller, when detecting for a first predetermined period of time that the gas is not supplied to anything else other than the fuel cell module, controls to stop the power generation of the fuel cell module for a second predetermined period of time.

A control method of a fuel cell system according to the embodiments of the disclosure herein is a control method of a fuel cell system having a fuel cell module configured to generate power by using gas supplied via a gas meter, the control method including the steps of:

detecting for a first predetermined period of time that the gas is not supplied to anything else other than the fuel cell module; and controlling to stop power generation of the fuel cell module for a second predetermined period of time, when detecting for the first predetermined period of time that the gas is not supplied to anything else other than the fuel cell module.

A fuel cell control apparatus according to the embodiments of the disclosure herein is a fuel cell control apparatus configured to control power generation of a fuel cell module that generates power by using gas supplied via a gas meter, the fuel cell control apparatus controlling, when detecting for a first predetermined period of time that the gas is not supplied to anything else other than the fuel cell module, to stop the power generation of the fuel cell module for a second predetermined period of time.

Advantageous Effect

According to the disclosure herein, downtime of the fuel cell for gas leakage detection may be shortened. Therefore, an operating ratio of the fuel cell may be improved.

DETAILED DESCRIPTION

First Embodiment

Figure 1:
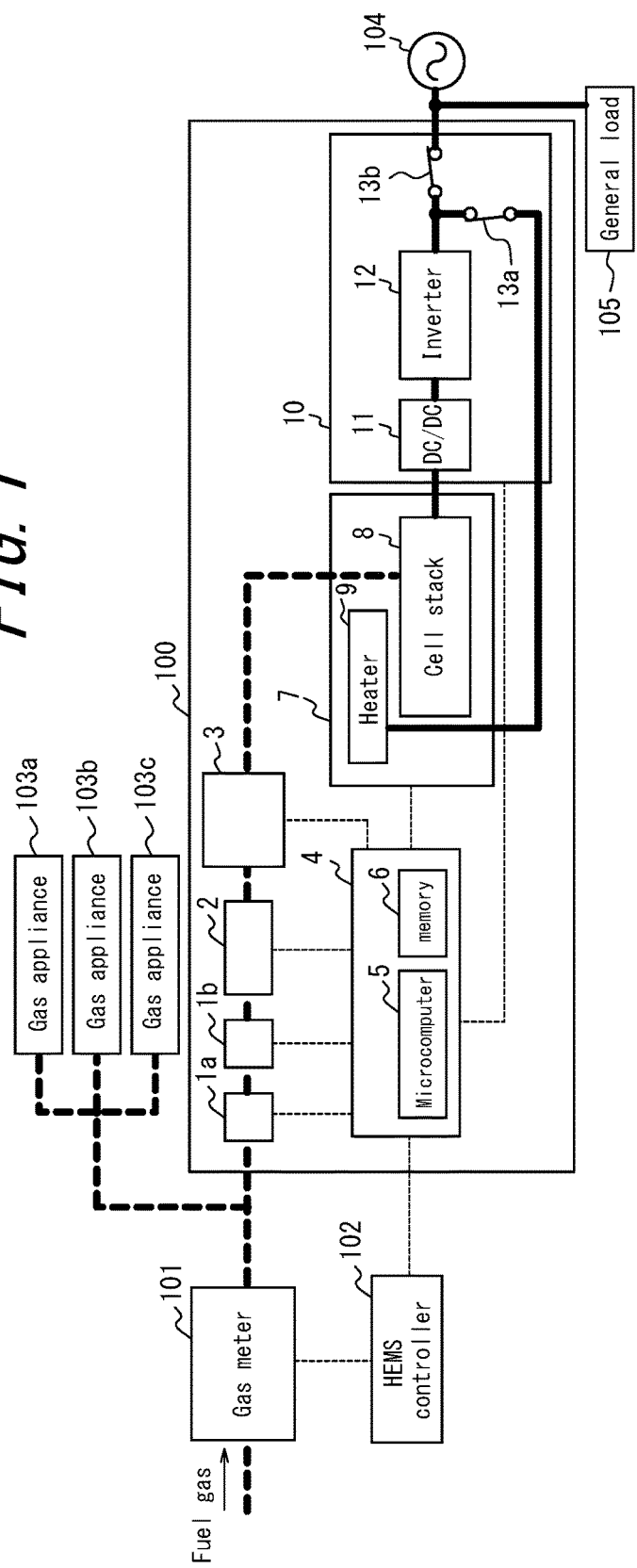
FIG. 1 is a block diagram illustrating a fuel cell system and surrounding apparatuses according to a first embodiment of the disclosure herein.

A fuel cell system 100 illustrated in FIG. 1 includes a fuel cell module 7, a pair of gas solenoid valves 1a and 1b, a gas flow meter 2, a gas pump 3, a fuel cell control apparatus 4, and a power supply unit 10. Note that in FIG. 1 bold lines indicate paths of electric power, and bold broken lines indicate paths of fuel gas. Also, narrow broken lines indicate flows of a control signal or communicated information.

The fuel cell module 7 is a module for generating power by receiving fuel gas supply. The fuel cell module 7 of the present embodiment is a solid oxide fuel cell (SOFC). The fuel cell module 7 includes a cell stack 8 for generating power by causing a reaction between the fuel gas supplied via a gas meter 101 and the air, and a heater 9 for heating and maintaining the cell stack 8 at suitable temperature for the power generation. The cell stack 8 is formed by laminating a plurality of power generation cells made of a highly heat-resistant material such as, for example, ceramics. The heater 9 is an electric heater for heating the cell stack 8 by using power received from the fuel cell module 7 or a grid 104.

Although in the present embodiment the heater 9 is provided to raise temperature of the cell stack 8, the heater 9 may also function as an anti-freeze heater of the fuel cell system 100.

Also, although in the present embodiment the heater 9 receives AC power having passed through the inverter 12 or the power supply from the grid 104, the heater 9 is not limited to such a configuration but may be directly supplied with DC power generated by the cell stack 8.

The gas solenoid valves 1a and 1b are a pair of valves for opening and closing a gas supply path to the fuel cell module 7 and have a mechanism to open and close the gas supply path by employing force of an electromagnet. In the present embodiment, the gas solenoid valves 1a and 1b open and close the path of the fuel gas supplied to each household via the gas meter 101. Providing the two gas solenoid valves 1a and 1b in series as illustrated in FIG. 1 enables, in case that one of the gas solenoid valves has a problem and cannot stop gas supply, the other gas solenoid valve to be operated to securely stop the gas supply.

The gas flow meter 2 is a flow meter for measuring a flow rate of the fuel gas supplied to the fuel cell module 7 via the gas meter 101 and the gas solenoid valves 1a and 1b. Information on the gas flow rate measured at each predetermined sampling time is transmitted to the fuel cell control apparatus 4 through a wired or wireless communication.

The gas pump 3, by swinging a diaphragm provided inside a pump head, adjusts the gas flow rate of the gas supplied to the fuel cell module 7. The fuel cell control apparatus 4, which will be described later, by controlling the gas pump 3 based on the information on the gas flow rate acquired from the gas flow meter 2, adjusts the gas flow rate of the gas supplied to the fuel cell module 7.

The fuel cell control apparatus 4 includes a microcomputer 5 for executing programs and a memory 6 for storing the programs and various information. The microcomputer 5 acquires information from each functional block of the fuel cell system 100 and controls such that the programs for controlling each functional block are executed. The fuel cell control apparatus 4, as indicated by the broken lines in FIG. 1, acquires various information from a HEMS controller 102, the gas flow meter 2, the fuel cell module 7, the power supply unit 10, and the like. Also, the fuel cell control apparatus 4, based on the various information thus acquired, transmits the control signals as indicated by the broken lines and controls the gas solenoid valves 1a and 1b, the gas pump 3, the fuel cell module 7, and the power supply unit 10. The transmission of various signals indicated by the broken lines may be carried out either in a wired or wireless manner. In the present embodiment, further, the fuel cell control apparatus 4 constitutes the controller.

The power supply unit 10 converts the power generated by the fuel cell module 7 and supplies thus converted power to a general load 105 and the like. The power supply unit 10 includes a DC/DC converter 11, an inverter 12, and switches 13a and 13b.

The DC/DC converter 11 boosts DC power supplied from the fuel cell module 7 without converting the DC power and outputs the boosted DC power to the inverter 12.

The inverter 12 converts the DC power supplied from the fuel cell module 7 via the DC/DC converter 11 into AC power at 100V or 200V and supplies the AC power to the general load 105 and the like.

The switches 13a and 13b are constituted by using individual relays or transistors and, based on the control signal from the fuel cell control apparatus 4, separately turned on/off. The fuel cell control apparatus 4, by turning the switch 13b on, supplies the power from the inverter 12, in place of the power from the grid 104, to the general load 105. Although a stable operation of the fuel cell module 7 is preferable from the viewpoint of power generation efficiency, a load-following operation to follow power consumption by the general load 105 may be carried out. Also, the fuel cell control apparatus 4, by turning the switch 13a on, supplies the power from the inverter 12 or the grid 104 to the heater 9.

The gas meter 101 is connected in series to a gas pipe for supplying the fuel gas to each household. The fuel gas, after passing through the gas meter 101, flows into multiple paths and supplied to the fuel cell system 100 as well as gas appliances 103a to 103c. Having such a structure, the gas meter 101 measures a total gas flow rate consumed by all gas appliances including the fuel cell system 100 in the household.

The gas meter 101 is connected to the HEMS controller 102 in such a manner as to be able to transmit a pulse signal thereto. The gas meter 101 outputs, to the HEMS controller 102, the pulse signal that changes at a rate proportional to the total gas flow rate measured.

The HEMS controller 102 periodically acquires, from the gas meter 101, the pulse signal indicative of information on the total gas flow rate of the gas used within one household. Also, the HEMS controller 102 has a network connection with the fuel cell control apparatus 4 in the fuel cell system 100 via Wi-Fi. The HEMS controller 102 communicates with the fuel cell control apparatus 4 by using ECHONET Lite® (ECHONET Lite is a registered trademark in Japan, other countries, or both) as a communication protocol on the Wi-Fi and thereby transmits the information on the total gas flow rate to the fuel cell control apparatus 4.

The HEMS controller 102 has a network connection also with an air conditioning, electric lights and the like in the household and is responsible for overall energy management in the household. For example, the HEMS controller 102 may control an indoor display to display power consumption of each appliance in the household.

In the present embodiment, although the HEMS controller 102 has the network connection with the fuel cell control apparatus 4 via the Wi-Fi, the network connection is not limited thereto. For example, the HEMS controller 102 may have the network connection with the fuel cell control apparatus 4 by using a communication protocol of other standards defining a physical layer such as ETHERNET® (ETHERNET is a registered trademark in Japan, other countries, or both) and PLC (Power Line Communication).

Also, although the HEMS controller 102, for the communication with the fuel cell control apparatus 4, uses ECHONET Lite® in combination with the Wi-Fi, this is not restrictive. For example, the HEMS controller 102 may communicate by using a combination of a communication protocol of other standards that define a top layer alone while giving flexibility to a physical layer such as SEP2.0 (Smart Energy Profile 2.0) of ZigBee® (ZigBee is a registered trademark in Japan, other countries, or both) and the Wi-Fi.

The gas appliances 103a to 103c are used in the household and may be, for example, a gas stove, gas heater, gas water heater, and the like. Although in this embodiment three gas appliances are used by way of example, any number of gas appliances may be connected.

The general load 105 is a load that operates on a single-phase AC 100V or 200V used in the household. Examples of the general load 105 include electrical appliances that should avoid power outage as much as possible such as a refrigerator, an emergency light, a hot water supply system, and a home network server, as well as general household loads such as a hair dryer, a home-use game machine, an audio system for playing music, and the like.

Although in the present embodiment the single-phase AC 200V or 100V is output to the general load 105, this is not restrictive. Since a commercial refrigerator, a commercial air conditioning, and motor driven in a factory often use three-phase three-wire 200V, an inverter for converting into the three-phase 200V may be provided in place of the inverter 12.

Although in the present embodiment the general load 105 being connected is assumed to be an electrical appliance usable in Japan, appropriate modifications may be made in consideration of the use of an electrical appliance which can be used outside of Japan. For example, an inverter capable of outputting AC 220 to 240V may be provided in place of the inverter 12, so as to allow for the connection of an electrical appliance which can be used in areas such as Asia, Oceania, and Europe.

Next, a detailed example of control of the fuel cell system 100 according to the first embodiment will be described.

In FIG. 1, the fuel cell control apparatus 4 first turns the switch 13a on and turns the switch 13b off. Thereby, the power from the grid 104 alone is supplied to the general load 105 and the heater 9. The fuel cell control apparatus 4 periodically acquires information on the temperature of the cell stack 8 from the fuel cell module 7. The fuel cell control apparatus 4, when the cell stack 8 reaches temperature (approximately 700° C.) suitable for power generation of the solid oxide fuel cell, opens the gas solenoid valves 1a and 1b to initiate the fuel gas supply to the fuel cell module 7. Also, the fuel cell control apparatus 4 acquires the information on the gas flow rate from the gas flow meter 2. Then, the fuel cell control apparatus 4 controls the gas pump 3 such that the fuel gas flow rate of the fuel gas to the fuel cell module 7 meets GGr2 [L/min.], an optimum value for the steady operation.

The fuel cell control apparatus 4, when the fuel cell module 7 starts the power generation, initiates operations of the DC/DC converter 11 and inverter 12 and controls such that the inverter 12 outputs AC 100V or 200V. The fuel cell control apparatus 4, when the inverter 12 outputs power of a predetermined voltage, turns the switch 13b on so as to initiate the power supply from the fuel cell system 100 to the general load 105.

The gas meter 101 measures the total gas flow rate of the gas supplied to the household and outputs the pulse signal which changes at the rate proportional to the gas flow rate measured. The HEMS controller 102 calculates the total gas flow rate from the pulse signal received from the gas meter 101 and, through the communication using the Wi-Fi and ECHONET® (ECHONET is a registered trademark in Japan, other countries, or both), transmits the information on the total gas flow rate to the fuel cell control apparatus 4.

Next, an example of control to shift the fuel cell system 100 into a standby state or a stopping state after the start of the steady operation thereof will be described.

The fuel cell control apparatus 4 periodically acquires the total gas flow rate HGr measured by the gas meter 101 from the HEMS controller 102 as well as the gas flow rate GGr of the gas supplied to the fuel cell module 7 from the gas flow meter 2. The fuel cell control apparatus 4 stores the number of days d elapsed after last time HGr=0 was maintained for a period of time t2 [hour] and determines whether the d reaches a predetermined number of days d1 or more (step S201). When the d is less than d1, the fuel cell control apparatus 4 considers that there is no need yet to control the fuel cell system 100 to initiate an operation of the gas leakage detection and waits until the d becomes equal to or more than d1. An optimal number of the d1 [day] is, for example, 20 [days].

The aforementioned t2 [hour] includes time required for a gas leakage detection system to determine that the gas is completely stopped and there is no gas leakage, and some time to spare. That is, when last time HGr=0 was maintained for the period of time t2 [hour] refers to when last time the gas leakage detection system determined that there was no gas leakage. An optimal time of the [hour] is, for example, ⅙ [hour], i.e., 10 minutes.

On the other hand, when the d becomes d1 or more, the fuel cell control apparatus 4 determines whether the number of days d from when last time HGr=0 was maintained for the period of time t2 [hour] reaches the predetermined number of days d2 (step S202). The d2 is the number of days that satisfies d1<d2 and set to be one day fewer than the number of days for the gas meter 101 to wait before actually displaying alarm. In this way, the fuel cell control apparatus 4 may make the fuel cell system 100 rapidly shift to a normal stopping operation when d=d2 is satisfied (step S210) and thus can avoid the display of the alarm by the gas meter 101. The normal stopping operation at step S210 is a stopping operation of the fuel cell by cooling down the cell stack 8 over a sufficient period of time, as is conventionally performed. The optimal number of the d2 [day] is, for example, 29 [days].

The fuel cell control apparatus 4, after the normal stopping operation of the fuel cell system 100 at step S210, maintains the stopping state for one day (step S211). Note that one day is defined as 24 hours herein. For example, when the stopping state begins at 23:00 of February 24, it is assumed that the one day elapses at 23:00 of February 25. For the general household, usually, during the one day the gas appliances 103a to 103c also stop for the period of time t2 (hour) or longer. Accordingly, since the time satisfying HGr=0 may be secured for the period of time t2 (hour) or longer, the gas leakage detection system may determine at step S211 that there is no gas leakage. After step S211, the fuel cell control apparatus 4 performs normal activation of the fuel cell system 100 (step S212). In this case, the normal activation refers to activation of the fuel cell by heating the cell stack 8 from room temperature to high temperature over a sufficient period of time, as is conventionally performed. At step S212, the number of days d is reset to 0, and thus this control flow ends.

At step S202, when the number of days d is less than the predetermined number of days d2, the fuel cell control apparatus 4 compares the gas flow rate GGr of the gas supplied to the fuel cell module 7 with the total gas flow rate HGr measured by the gas meter 101. Then, the fuel cell control apparatus 4 determines whether a state satisfying GGr=HGr, that is, whether a period of time in which no gas is consumed by the gas appliances 103a to 103c other than the fuel cell system 100 is maintained for the period of time t1 (hour) (step S203).

The aforementioned t1 (hour) is a period of time that allows determination that, when the gas appliances 103a to 103c stop approximately for this period of time, the gas appliances 103a to 103c are likely to stop continuously for a period of time t2 (hour) thereafter. An optimal time of the t1 (hour) is, for example, ½ (hour), i.e., 30 minutes.

The fuel cell control apparatus 4, when determining at step S203 that the state satisfying GGr=HGr is not maintained for the period of time t1 [hour], returns to step S202. The fuel cell control apparatus 4 controls the fuel cell system 100 to continue a normal operation thereof until the state satisfying GGr=HGr is maintained for the period of time t1 (hour).

On the other hand, the fuel cell control apparatus 4, when determining at step 203 that the state satisfying GGr=HGr is maintained for the period of time t1 (hour), shifts the fuel cell system 100 into the standby state (step S204). Here, the shift of the fuel cell system 100 into the standby state is completed by the following three steps: first, closing at least one of the gas solenoid valves 1a and 1b so as to stop the fuel gas supply to the fuel cell module 7; secondly, turning the switch 13b off so as to switchover a source of the power supply to the general load 105 from the fuel cell to the grid 104; and, thirdly, turning the heater 9 on and monitoring the temperature of the cell stack 8 so as to raise or maintain the temperature thereof at predetermined temperature or higher.

According to the present embodiment, the fuel cell control apparatus 4, when the fuel cell system 100 is in the standby state, supplies the power to the heater 9 at all times. However, the fuel cell control apparatus 4 may supply the power only during a portion of the time when the fuel cell system 100 is in the standby state and monitor the temperature of the cell stack 8 so as to raise or maintain the temperature thereof at the predetermined temperature or higher.

Next, the fuel cell control apparatus 4 determines whether the fuel cell system 100 has been in the standby state for a period of time t3 (hour) or longer (step S205). Here, the period of time t3 (hour) refers to a maximum period of time that allows the fuel cell system 100 to stop the gas supply so as to stop the power generation.

When the fuel cell control apparatus 4 determines at step S205 that the fuel cell system 100 has been in the standby state for the period of time t3 (hour) or longer, the fuel cell control apparatus 4 restarts the fuel cell system 100 (step S208). Here, the restart of the fuel cell system 100 is completed by the following three steps: first, opening both of the gas solenoid valves 1a and 1b so as to restart the fuel gas supply to the fuel cell module 7; secondly, turning the switch 13b on so as to start the power supply from the fuel cell module 7 to the general load 105; and, thirdly, turning off the power supply to the heater 9.

After restarting the fuel cell system 100 at step S208, the fuel cell control apparatus 4, in order to restore a normal power generation state of the fuel cell system 100, controls the fuel cell system 100 to maintain the operation for a period of time t4 (hour) (step S209). Then, the fuel cell control apparatus 4 once again returns to step S202 for a gas flow rate determination operation.

When determining at step S205 that the fuel cell system 100 has not been in the standby state for the period of time t3 (hour) or longer, the fuel cell control apparatus 4 determines whether HGr=0 is maintained for the period of time t2 (hour) (step S206). HGr=0 refers to a state in which none of the gas appliances including the fuel cell system 100 is consuming gas. When this state is maintained for the period of time t2 (hour), the gas leakage detection system may determine that the gas supply is completely stopped and there is no gas leakage.

When determining at step S206 that HGr=0 is not maintained for the period of time t2 (hour) or longer, the fuel cell control apparatus 4 returns to step S205. Then, the fuel cell control apparatus 4 initializes a counter of the t2 (hour) and determines whether the period of time t2 (hour) is maintained afresh after HGr=0 is satisfied.

When determining at step S206 that HGr=0 is maintained for the period of time t2 (hour) or longer, the fuel cell control apparatus 4 restarts the fuel cell system 100 (step S207). Here, the number of days d is reset to 0, and thus this control flow ends.

According to the first embodiment, as described above, the fuel cell system 100 is shifted into the standby state when the gas appliances (103a to 103c) stop. Therefore, there is no need to stop the fuel cell system 100 for one day for the gas leakage detection, as is conventionally performed. Accordingly, the operating ratio of the fuel cell may be improved.

According to the present embodiment, further, when the fuel cell system 100 is shifted into the standby state, the heater 9 maintains the temperature of the cell stack 8. Therefore, when the fuel cell system 100 is restarted from the standby state, the fuel cell system 100 may restore the stable operation state in a shorter time.

Second Embodiment

Figure 3:
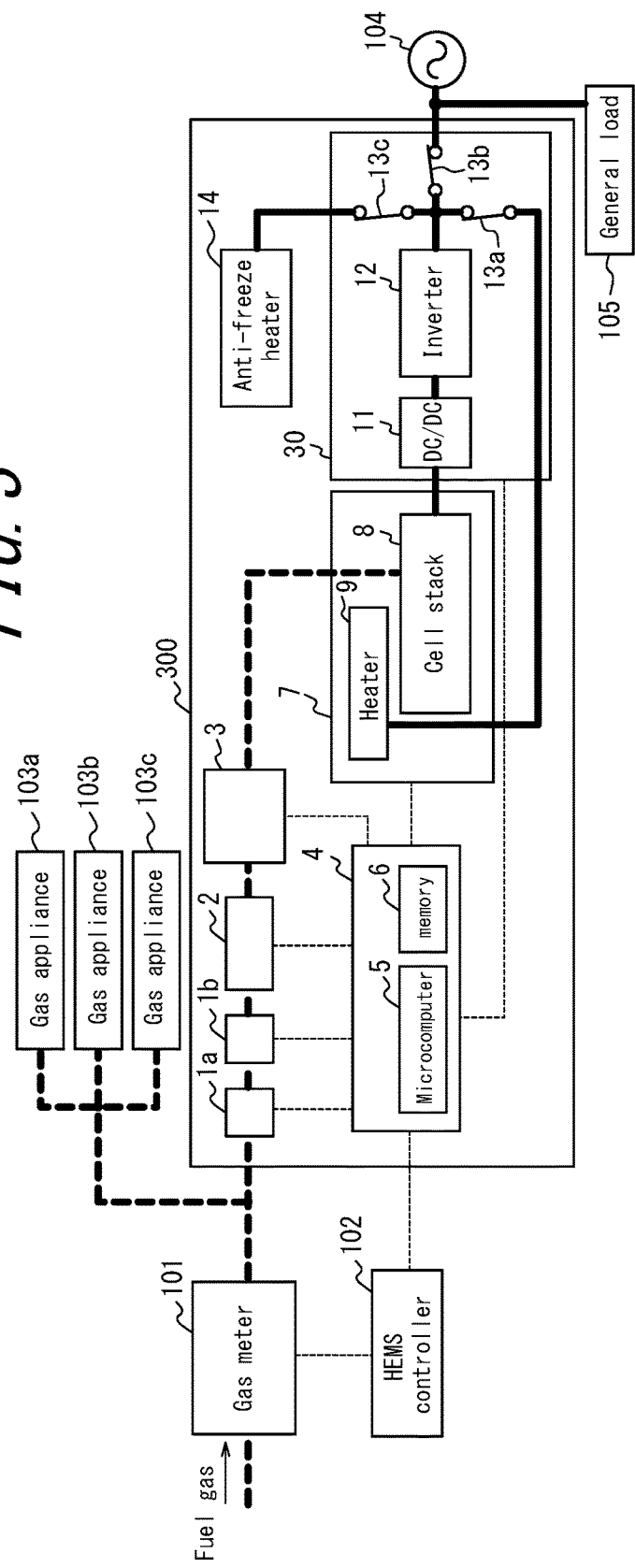
FIG. 3 is a block diagram illustrating a fuel cell system and surrounding apparatuses according to a second embodiment of the disclosure herein.

A second embodiment illustrated in FIG. 3 has the same configuration as the first embodiment in FIG. 1, except that the output of the inverter 12 in a fuel cell system 300 may supply power to an anti-freeze heater 14 via a switch 13c. Accordingly, descriptions of the same configurations will be omitted.

A power supply unit 30 includes the DC/DC converter 11, the inverter 12, and the switches 13a and 13b. The fuel cell control apparatus 4 controls the switch 13b so as to switchover the power supply to the general load 105 between the inverter 12 and the grid 103. Also, the fuel cell control apparatus 4 turns the switch 13a on such that the power from the inverter 12 or the grid 104 is supplied to the heater 9. The power from the inverter 12 or the grid 104 may be supplied to the anti-freeze heater 14 via the switch 13c.

The anti-freeze heater 14 is an electric heater for receiving the power supplied from the fuel cell module 7 and thereby preventing the fuel cell system 300 to be frozen.

Next, a detailed example of control of the fuel cell system 300 according to the second embodiment will be described.

In FIG. 3, the fuel cell control apparatus 4 first turns the switch 13a on and turns the switches 13b and 13c off. Thereby, the power is supplied to the general load 105 and the heater 9 from the grid 104. The fuel cell control apparatus 4 periodically receives the information on the temperature of the cell stack 8 from the fuel cell module 7. When the cell stack 8 reaches the temperature (approximately 700° C.) suitable for the power generation of the solid oxide fuel cell, the fuel cell control apparatus 4 opens the gas solenoid valves 1a and 1b to start the fuel gas supply to the fuel cell module 7. Also, the fuel cell control apparatus 4 acquires the information on the gas flow rate from the gas flow meter 2 and controls the gas pump 3 such that the fuel gas rate of the fuel gas supplied to the fuel cell module 7 meets GGr2 (L/min.), an optimum value for the stable operation.

When the fuel cell module 7 starts generating the power, the fuel cell control apparatus 4 starts the operations of the DC/DC converter 11 and the inverter 12 and controls such that the inverter 12 outputs AC 100V or 200V. When the inverter 12 outputs the power of the predetermined voltage, the fuel cell control apparatus 4 turns the switch 13b on so as to start the power supply to the general load 105 from the fuel cell system 300.

The gas meter 101 measures the total gas flow rate of the gas supplied to the household and outputs the pulse signal that changes at the speed proportional to the gas flow rate measured. The HEMS controller 102 calculates the total gas flow rate from the pulse signal received from the gas meter 101 and, through the communication using the Wi-Fi and ECHONET®, transmits the information on the total gas flow rate to the fuel cell control apparatus 4.

Next, an example of control after the fuel cell system 300 starts the stable operation until the fuel cell system 300 shifts into the standby state or the stopping state will be described with reference to FIG. 4.

The fuel cell control apparatus 4 periodically acquires the total gas flow rate HGr measured by the gas meter 101 from the HEMS controller 102 and also acquires the gas flow rate GGr of the gas supplied to the fuel cell module 7 from the gas flow meter 2. During the steady operation of the fuel cell system 300, the fuel gas flow rate of the fuel gas supplied to the fuel cell module 7 is targeted at the GGr2 (L/min.) and controlled accordingly (step S401). The fuel cell control apparatus 4 stores the number of days d elapsed after last time HGr=0 was maintained for the period of time t2 (hour) and determines whether the d is equal to or more than the predetermined number of days d1 (step S402). When the d is less than the d1, the fuel cell control apparatus 4 determines that there is no need yet to control the fuel cell system 300 to start the operation of the gas leakage detection and waits until the d reaches d1 or more. An optimal number of the d1 (day) is, for example, 20 (days).

The aforementioned t2 [hour] includes the time required for the gas leakage detection system to determine that the gas is completely stopped and there is no gas leakage, and some time to spare. That is, when last time HGr=0 was maintained for the period of time t2 [hour] refers to when last time the gas leakage detection system determined that there was no gas leakage. An optimal time of the t2 [hour] is, for example, ⅙ [hour], i.e., 10 minutes.

On the other hand, when the d is d1 or more, the fuel cell control apparatus 4 determines whether the number of days d after last time HGr=0 was maintained for the period of time t2 [hour] reaches the predetermined number of days d2 (step S403). The d2 is the number of days that satisfies d1<d2 and set to one day before the day on which the gas meter 101 actually displays the alarm. In this way, the fuel cell control apparatus 4 may rapidly shift the fuel cell system 300 into the normal stopping operation when d=d2 is satisfied (step S416) and thus can avoid the display of the alarm by the gas meter 101. The normal stopping operation at step S416 is the stopping operation of the fuel cell by cooling down the cell stack 8 over a sufficient period of time, as is conventionally performed. An optimal number of the d2 [day] is, for example, 29 [days].

Figure 2:
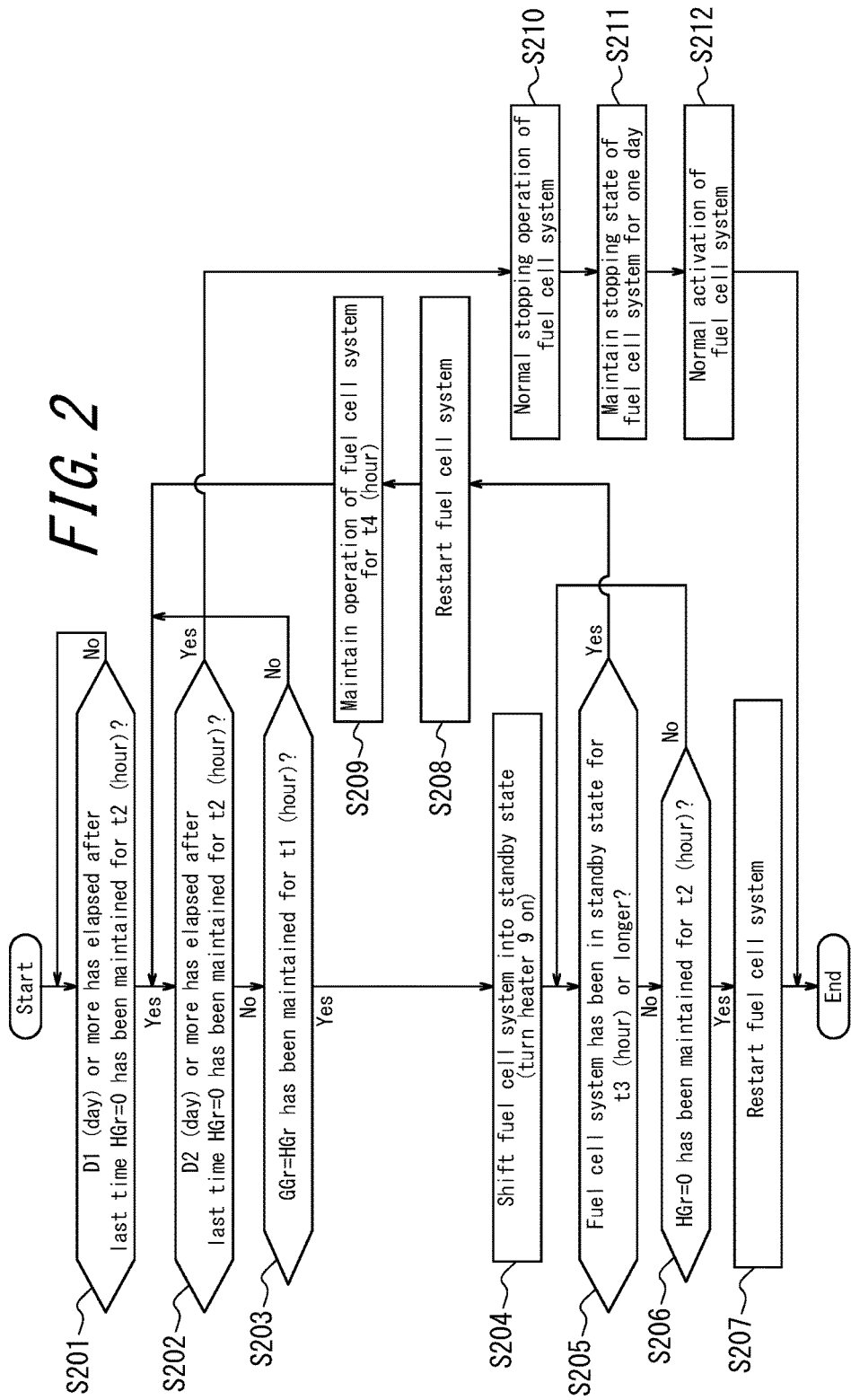
FIG. 2 illustrates a control flow of the fuel cell system according to the first embodiment to stop a fuel cell module.

The fuel cell control apparatus 4, after the normal stopping operation of the fuel cell system 300 at step S416, maintains the stopping state for one day (step S417). Since the control performed after the step S417 is the same as that after the step S211 in FIG. 2, a description thereof will be omitted.

At step S403, when the number of days d is less than the predetermined number of days d2, the fuel cell control apparatus 4 compares the gas flow rate GGr of the gas supplied to the fuel cell module 7 with the total gas flow rate HGr measured by the gas meter 101. Then, the fuel cell control apparatus 4 determines whether the state satisfying GGr=HGr, that is, whether a period of time in which no gas is consumed by the gas appliances 103a to 103c other than the fuel cell system 300 is maintained for the period of time t1 (hour) (step S404).

The aforementioned t1 (hour) is a period of time that allows determination that, when the gas appliances 103a to 103c stop approximately for this period of time, the gas appliances 103a to 103c are likely to stop continuously for the period of time t2 (hour). An optimal time of the t1 (hour) is, for example, ½ (hour), i.e., 30 minutes.

The fuel cell control apparatus 4, when determining at step S404 that the state satisfying GGr=HGr is not maintained for the period of time t1 [hour], returns to step S403 and controls the fuel cell system 100 to continue the normal operation until the state satisfying GGr=HGr is maintained for the period of time t1 (hour).

On the other hand, the fuel cell control apparatus 4, when determining at step 404 that the state satisfying GGr=HGr is maintained for the period of time t1 (hour), increases a target gas flow rate of the gas supplied to the fuel cell module 7 to GGr1 (L/min.) (step S405). Also, the fuel cell control apparatus 4 turns the switch 13c on to operate the anti-freeze heater 14 (step S405). Thereby, more fuel gas is supplied to the fuel cell module 7 and the generated power is increased, whereby the temperature of the cell stack 8 becomes higher than usual and, further, the anti-freeze heater 14 is allowed to use the increased power.

Next, the fuel cell control apparatus 4 compares the gas flow rate GGr of the gas supplied to the fuel cell module 7 with the total gas flow rate HGr measured by the gas meter 101 (step S406). Then, when determining that the GGr and the HGr are not equal to each other, the fuel cell control apparatus 4 returns the target gas flow rate of the gas supplied to the fuel cell module 7 to the GGr2 and also stops the power supply to the anti-freeze heater 14 (step S412). The fuel cell control apparatus 4 performs this in order to stop the step to shift the fuel cell system 300 into the standby state, because it is found that the gas appliances 103a to 103c other than the fuel cell module 7 are consuming the gas. The fuel cell control apparatus 4 once again returns to S403 and controls the fuel cell system 300 to perform the steady operation until GGr=HGr is maintained for the period of time t1 (hour).

When determining at step S406 that the GGr and the HGr are equal to each other, the fuel cell control apparatus 4 determines whether the temperature of the fuel cell module 7 is at T1 (° C.) or higher (step S407). This is a step for checking whether the fuel cell module 7 is maintained at sufficiently high temperature to be able to allow the shift into the standby state by increasing the target gas flow rate of the gas supplied to the fuel cell module 7 to GGr1 (L/min.).

When determining that the temperature of the fuel cell module 7 is not equal to or higher than the T1 (° C.), the fuel cell control apparatus 4 returns to step S406 and waits until GGr=HGr is satisfied and, simultaneously, the temperature of the fuel cell module 7 reaches the T1 (° C.) or higher. Then, when the fuel cell control apparatus 4 determines that the temperature of the fuel cell module 7 reaches the T1 (° C.) or higher, shifts the fuel cell system 300 into the standby state (step S408). Here, the shift of the fuel cell system 300 into the standby state is completed by the following two steps: first, closing at least one of the gas solenoid valves 1a and 1b to stop the fuel gas supply to the fuel cell module 7; and, secondly, turning off the switches 13c and then 13b so as to changeover the power supply source of the general load 105 from the fuel cell to the grid 104.

Next, the fuel cell control apparatus 4 determines whether the fuel cell system 300 has been in the standby state for a period of time t3 (hour) or longer (step S409). Here, the time t3 refers to a maximum period of time which allows stopping the gas supply to the fuel cell system 300 and thus stopping the power generation.

When determining at step S409 that the fuel cell system 300 has been in the standby state for the period of time t3 (hour) or longer, the fuel cell control apparatus 4 restarts the fuel cell system 300 (step S414). Here, the restart of the fuel cell system 300 is completed by the following two steps: first, opening both of the gas solenoid valves 1a and 1b so as to restart the fuel gas supply to the fuel cell module 7; and, secondly, turning the switch 13b on so as to changeover the power supply source of the general load 105 from the grid 104 to the fuel cell.

After restarting the fuel cell system 300 at step S414, the fuel cell control apparatus 4, in order to restore a steady power generation state of the fuel cell system 300, controls the fuel cell system 300 to maintain the operation for a period of time t4 (hour) (step S415). Then, the fuel cell control apparatus 4 once again shifts to the gas flow rate determination operation at step S403.

When determining at step S409 that the fuel cell system 300 has not been in the standby state for the period of time t3 (hour) or longer, the fuel cell control apparatus 4 determines whether HGr=0 is maintained for the period of time t2 (hour) (step S410). HGr=0 refers to the state in which none of the gas appliances including the fuel cell system 300 is consuming gas. When this state is maintained for the period of time t2 (hour), the gas leakage detection system may determine that the gas is completely stopped and there is no gas leakage.

When determining at step S410 that HGr=0 is not maintained for the period of time t2 (hour), the fuel cell control apparatus 4 determines whether the temperature of the fuel cell module 7 is at T2 (° C.) or higher (step S413). Here, the T2 (° C.) is predetermined temperature that satisfies T2<T1. When determining that the temperature of the fuel cell module 7 is not at the T2 (° C.) or higher, the fuel cell control apparatus 4 restarts the fuel cell system 300 (step S414). This is because, when the temperature of the fuel cell module 7 is under the T2 (° C.) and the fuel cell system 300 is shifted into the standby state, it takes time for the fuel cell to be restarted. On the other hand, when determining that the temperature of fuel cell module 7 is at the T2 (° C.) or higher, the fuel cell control apparatus 4 returns to step S409. Then, the fuel cell control apparatus 4 initializes the counter of the period of time t2 (hour) and determines whether the period of time t2 is maintained anew after HGr=0 is satisfied.

When determining at step S410 that HGr=0 is maintained for the period of time t2 (hour), the fuel cell control apparatus 4 restarts the fuel cell system 300 (step S411). At this time, the number of days d is reset to 0, and thus this control flow ends.

According to the second embodiment, as described above, before the fuel cell system 300 is shifted into the standby state, the gas flow rate of the gas supplied to the fuel cell module 7 is increased and thereby the temperature of the cell stack 8 is raised. Accordingly, the cell stack 8 may be maintained at relatively high temperature after the shift into the standby state, allowing the fuel cell system 300 to restore the steady operation state in a shorter time when restarted from the standby state.

According to the present embodiment, also, the anti-freeze heater 14 is operated by using the power generated by increasing the gas supply amount to the fuel cell module 7. This enables efficient use of the energy of the gas supplied for fast restart of the fuel cell module 7.

Although according to the present embodiment the anti-freeze heater 14 is configured to receive the power supply from the fuel cell module 7 via the inverter 12, the switch 13c, and the like, the anti-freeze heater 14 may receive the power supply from the grid 104 as well.

Third Embodiment

Figure 5:
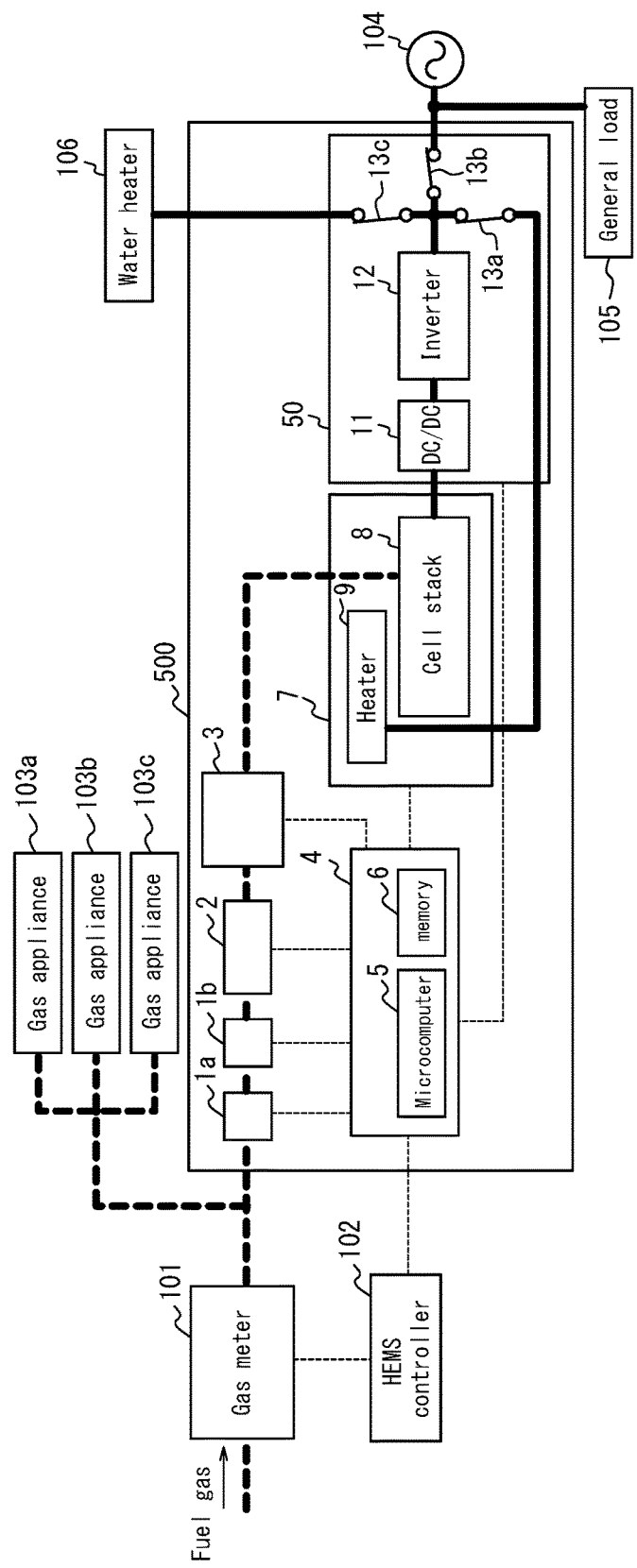
FIG. 5 is a block diagram illustrating a fuel cell system and surrounding apparatuses according to a third embodiment of the disclosure herein.

A third embodiment illustrated in FIG. 5 has the same configuration as those in FIGS. 1 and 3, other than that the output of the inverter 12 in a fuel cell system 500 may supply power to a water heater 106 via the switch 13c. Therefore, descriptions of the same configurations will be omitted.

The power supply unit 50 includes the DC/DC converter 11, the inverter 12, and the switches 13a and 13b. The fuel cell control apparatus 4 controls the switch 13b so as to changeover the power supply to the general load 105 between the inverter 12 and the grid 104. Also, the fuel cell control apparatus 4 turns the switch 13a on so as to supply the power to the heater 9 from the inverter 12 or the grid 104. The power from the inverter 12 may be supplied to the water heater 106 via the switch 13c.

The water heater 106 is an electric water heater for supplying hot water to the household by receiving the power supply from the fuel cell module 7. Although according to the present embodiment the water heater 106 receives the power supply from the fuel cell module 7, the water heater 106 may receive the power supply from the grid 104 as well.

Figure 4:
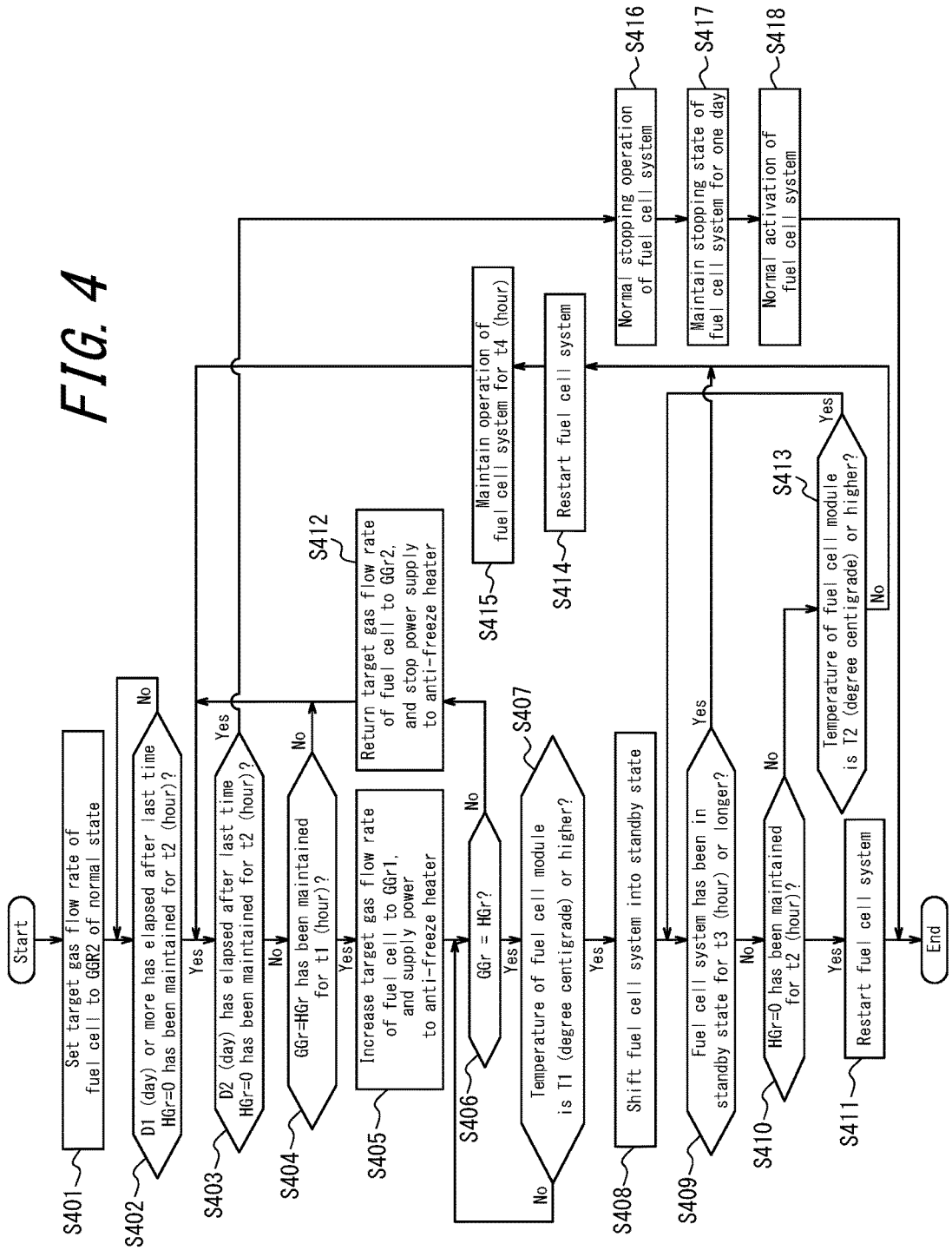
FIG. 4 illustrates a control flow of the fuel cell system according to the second embodiment to stop the fuel cell module.

A detailed example of control of the fuel cell system 500 according to the third embodiment may be substantialized simply by adding two modifications to the example of the control in FIG. 4: first, at step S405, supplying the power to the water heater 106 in place of the anti-freeze heater 14; and, secondly, at step S412, turning off the power supply to the water heater 106 in place of the power supply to the anti-freeze heater 14. Accordingly, detailed descriptions of other configurations will be omitted.

According to the third embodiment, as described above, before the fuel cell system 500 is shifted into the standby state, the gas supply amount to the fuel cell module 7 is increased so as to raise the temperature of the cell stack 8. Thereby, the cell stack 8 may be maintained at relatively high temperature after the shift into the stand by state, allowing the fuel cell system 500 to restore the steady operation state in a shorter time when restarted from the standby state.

According to the present embodiment, also, the power generated by increasing the gas supply amount to the fuel cell module 7 is used to operate the water heater 106. Accordingly, the energy of the gas supplied for fast restart of the fuel cell module 7 may be efficiently used.

Fourth Embodiment

Figure 6:
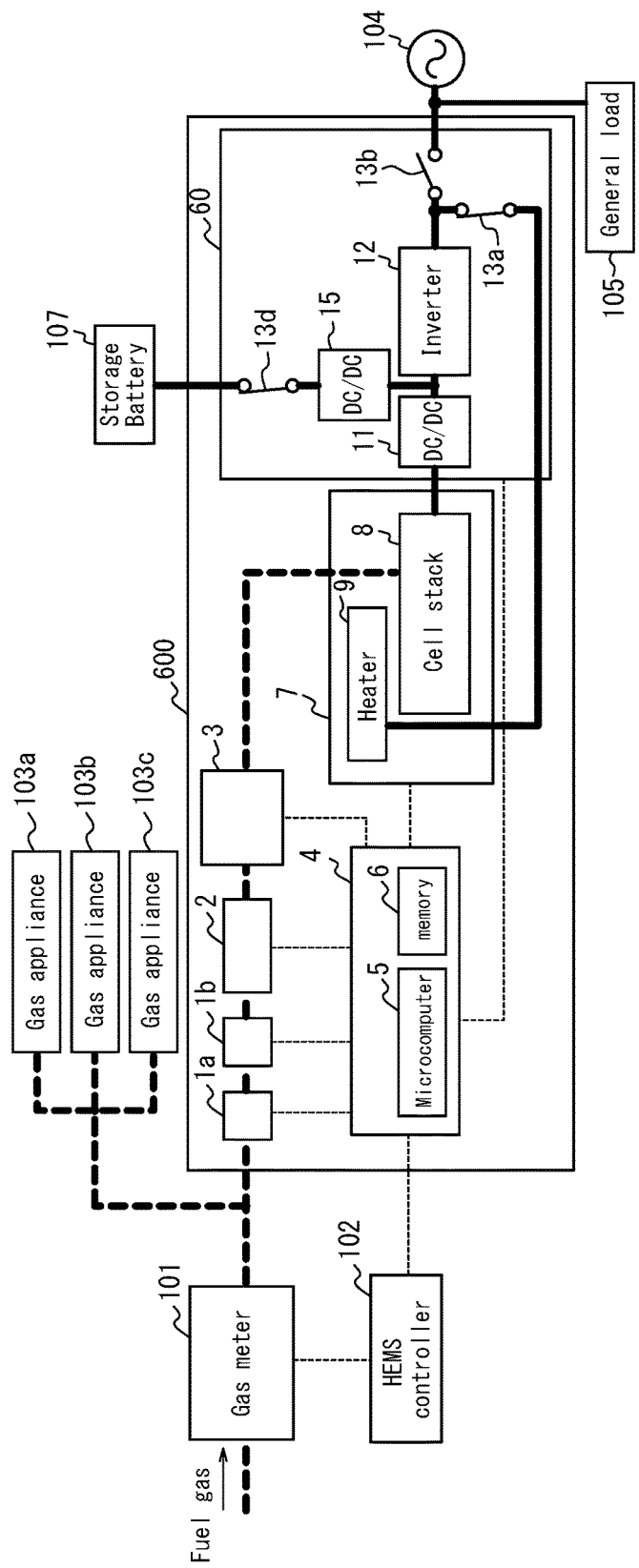
FIG. 6 is a block diagram illustrating a fuel cell system and surrounding apparatuses according to a fourth embodiment of the disclosure herein.

A fourth embodiment illustrated in FIG. 6 has approximately the same configuration as those in FIGS. 1, 3, and 5, other than the output from the DC/DC converter 11 in a fuel cell system 600 may supply the power to a storage battery 107 via a second DC/DC converter 15 and a switch 13d. Therefore, descriptions of the same configurations will be omitted.

The power supply unit 60 includes the DC/DC converter 11, the inverter 12, and the switches 13a and 13b. The fuel cell control apparatus 4 controls the switch 13b so as to changeover the power supply to the general load 105 between the inverter 12 and the grid 104. Also, the fuel cell control apparatus 4 turns the switch 13a on so as to supply the power to the heater 9 from the inverter 12 or the grid 104. The output from the DC/DC converter 11 may be stored in the storage battery 107 via the second DC/DC converter 15 and the switch 13d.

The storage battery 107 receives the power from the fuel cell module 7 and stores the generated power. Although the storage battery 107 used in the present embodiment is a lithium ion battery, storage batteries of other types such as a nickel hydride battery may be used. Other than such single storage batteries, a storage battery mounted on an electric vehicle (EV) or a plug-in hybrid vehicle (PHV) may also be charged. Although in the present embodiment the storage battery receives the power supply from the fuel cell module 7, the storage battery may receive the power supply from the grid 104 as well.

A detailed example of the control of the fuel cell system 600 according to the fourth embodiment is applicable to the fourth embodiment by simply adding two modifications to the example of the control in FIG. 4: first, at step S405, supplying the electric power to the storage battery 107 in place of the anti-freeze heater 14; and, secondly, at step S412, turning off the power supply to the storage battery 107 in place of the power supply to the anti-freeze heater 14. Therefore, detailed descriptions of the other configurations will be omitted.

According to the fourth embodiment, as described above, prior to shifting the fuel cell system 600 into the standby state, the gas supply amount to the fuel cell module 7 is increased and the temperature of the cell stack 8 is raised. Thereby, the cell stack 8 may be maintained at relatively high temperature, allowing the fuel cell system 600 to restore the steady operation state in a shorter time when reactivated from the standby state.

According to the present embodiment, further, the electric power generated by increasing the gas supply amount to the fuel cell module 7 is charged to the storage battery 107. According to the present embodiment, therefore, the energy of the gas supplied for fast restart of the fuel cell module 7 may be used without being wasted.

Although the disclosure has been described based on the figures and the embodiments, it is to be understood that various changes and modifications may be implemented based on the present disclosure by those who are ordinarily skilled in the art. Accordingly, such changes and modifications are included in the scope of the disclosure herein. For example, functions and the like included in each unit, each step and the like may be rearranged without logical inconsistency, so as to combine a plurality of units or steps together or to separate them.

Many aspects of the disclosure herein may be represented by a series of operations executed by a computer system or other hardware those are capable of executing a program instruction. The computer system or the other hardware include, for example, a general-purpose computer, a PC (personal computer), a special purpose computer, a workstation, PCS (Personal Communications System; a personal mobile communication system), an RFID receiver, an electronic notepad, a laptop computer, a GPS (Global Positioning System) receiver, and other programmable data processing apparatuses. Note that in each embodiment the various operations are executed by a dedicated circuit implemented with a program instruction (software) (e.g., discrete logic gates interconnected to perform a specific function), or a logical block, a program module and the like executed by at least one processor. The at least one processor for executing the logical block, the program module and the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a processor, a controller, a microcontroller, a microprocessor, an electronic apparatus, and other apparatuses designed to be capable of executing the functions described herein, and/or a combination thereof. The embodiment presented herein is implemented by, for example, hardware, software, firmware, middleware, a microcode, or any combination thereof. The instruction may be a program code or a code segment for executing a necessary task. The instruction may be stored in a machine-readable non-transitory storage medium or in another medium. The code segment may represent any combination of a procedure, a function, a subprogram, a program, a routine, a subroutine, a module, a software package, a class or an instruction, and a date structure or a program statement. The code segment, with another code segment or a hardware circuit, transmits/receives information, a data argument, a variable, and memory contents. Thereby, the code segment is connected to the another code segment or the hardware circuit.

The network used herein includes, unless otherwise specified, the Internet, an ad hoc network, LAN (Local Area Network), a cellular network, WPAN (Wireless Personal Area Network), other networks, or combinations any of them. Components of a radio network include, for example, an access point (e.g., a Wi-Fi access point), a Femtocell, and the like. Further, a radio communication apparatus maybe connected to a radio network that uses the Wi-Fi, Bluetooth® (Bluetooth is a registered trademark in Japan, other countries, or both), a cellular communication technique (e.g. CDMA (Code Division Multiple Access), TDMA (Time Division Multiple Access), FDMA (Frequency Division Multiple Access), OFDMA (Orthogonal Frequency Division Multiple Access), SC-FDMA (Single-Carrier Frequency Division Multiple Access), or other wireless technologies and/or technical standards.

Also, a machine-readable non-transitory storage medium used herein may constitute a solid state memory or a tangible carrier (medium) readable by the computer such as a magnetic disk and an optical disk, and stores an appropriate set of computer instructions such as program modules and a data structure those for causing the processor to execute the technique disclosed herein. The computer-readable medium includes an electric connection with at least one wiring, a magnetic disk storage media, a magnetic cassette, a magnetic tape, other magnetic and optical storage devices (e.g., a CD (Compact Disk), LaserDisc® (LaserDisc is a registered trademark in Japan, other counties, or both), DVD® (DVD is a registered trademark in Japan, other countries, or both), a floppy Disk® (floppy disk is a registered trademark in Japan, other countries, or both), and Blu-ray Disc® (Blu-ray Disc is a registered trademark in Japan, other countries, or both)), a portable computer disk, RAM (Random Access Memory), ROM (Read-Only Memory), a ROM such as an EPROM, an EEPROM, or a flash memory that is rewritable and programmable, other tangible storage media capable of storing information, or any combination thereof. The memory may be provided inside and/or outside the processor/processing unit. Here, the term "memory" means all types of a long-term memory, a short-term memory, a volatile memory, a non-volatile memory, and other memories. A type of the memory, the number of memories, and a type of the medium to store the information are not limited.

Note that the system disclosed herein includes various modules and/or units for executing specific functions, and the modules and/or the units are schematically illustrated for the purpose of brief description of functionality thereof and do not necessarily represent specific hardware and/or software. In that sense, these modules, units, and other components may be any hardware and/or software implemented to substantially execute the specific functions described herein. Various functions of different components may be substantialized by combining or separating the hardware and/or the software in any manner, and may be used separately or in any combination. Further, an input/output or I/O device and a user interface may be a keyboard, a display, a touch screen, a pointing device, and the like but not limited thereto, and may be connected to the system directly, or via an I/O controller that intervenes. As described above, various aspects of the disclosure herein may be implemented in various embodiments, and all the various embodiments are included in the scope of the disclosure herein.

REFERENCE SIGNS LIST 1a, 1b gas solenoid valve
2 gas flow meter
3 gas pump
4 fuel cell control apparatus (controller)
5 microcomputer
6 memory
7 fuel cell module
8 cell stack
9 heater
10, 30, 50, 60 power supply unit
11 DC/DC converter
12 inverter
13a, 13b, 13c switch
14 anti-freeze heater
15 second DC/DC converter
100, 300, 500, 600 fuel cell system
101 gas meter
102 HEMS controller
103a, 103b, 103c gas appliance
104 grid
105 general load
106 water heater
107 storage battery

The invention claimed is:

1. A fuel cell system having a fuel cell module configured to generate power by using gas supplied via a gas meter and a controller configured to control power generation of the fuel cell module, the fuel cell system causes a gas leakage detection system to determine that there is no gas leakage by stopping gas supply via the gas meter for a second predetermined period of time within a predetermined number of days,
wherein the controller controls to raise or maintain temperature of the fuel cell module when detecting for a first predetermined period of time that the gas is not supplied to anything else other than the fuel cell module,
wherein the controller controls to stop the power generation of the fuel cell module for the second predetermined period of time when the fuel cell module is maintained at predetermined temperature or higher, and
wherein the controller controls the fuel cell module to start the power generation when the fuel cell system is stopped for a third predetermined period of time, the third predetermined period of time is a maximum period of time that allows the fuel cell system to stop the gas supply so as to be in a standby state.

2. The fuel cell system according to claim 1, wherein the controller is configured to acquire a signal output from the gas meter and, detect the first predetermined period of time based on the signal.

3. The fuel cell system according to claim 2, wherein the controller, when the predetermined number of days has elapsed after last time the power generation of the fuel cell module is stopped for the second predetermined period of time or longer, controls to stop the power generation of the fuel cell module for the second predetermined period of time.

4. The fuel cell system according to claim 2, comprising a heater configured to heat the fuel cell module, wherein the controller, during at least a portion of the second predetermined period of time, operates the heater by using energy supplied from a unit other than the fuel cell module.

5. The fuel cell system according to claim 2, wherein the fuel cell module is configured to be able to supply generated power to a load or a storage battery, wherein the controller, after increasing the power generation of the fuel cell module and supplying the power to the load or the storage battery, controls to stop the power generation of the fuel cell module for the second predetermined period of time.

6. The fuel cell system according to claim 1, wherein the controller, when the predetermined number of days has elapsed after last time the power generation of the fuel cell module is stopped for the second predetermined period of time or longer, controls to stop the power generation of the fuel cell module for the second predetermined period of time.

7. The fuel cell system according to claim 6, comprising a heater configured to heat the fuel cell module, wherein the controller, during at least a portion of the second predetermined period of time, operates the heater by using energy supplied from a unit other than the fuel cell module.

8. The fuel cell system according to claim 6, wherein the fuel cell module is configured to be able to supply generated power to a load or a storage battery, wherein the controller, after increasing the power generation of the fuel cell module and supplying the power to the load or the storage battery, controls to stop the power generation of the fuel cell module for the second predetermined period of time.

9. The fuel cell system according to claim 1, comprising a heater configured to heat the fuel cell module, wherein the controller, during at least a portion of the second predetermined period of time, operates the heater by using energy supplied from a unit other than the fuel cell module.

10. The fuel cell system according to claim 9, wherein the heater is an anti-freeze heater of the fuel cell system.

11. The fuel cell system according to claim 1, wherein the fuel cell module is configured to be able to supply generated power to a load or a storage battery, wherein the controller, after increasing the power generation of the fuel cell module and supplying the power to the load or the storage battery, controls to stop the power generation of the fuel cell module for the second predetermined period of time.

12. The fuel cell system according to claim 11, wherein the load is an anti-freeze heater of the fuel cell system.

13. The fuel cell system according to claim 11, wherein the load is a water heater of the fuel cell system.

14. The fuel cell system according to claim 11, wherein the controller, after reducing a charging amount of the storage battery, controls to supply the power generated by the fuel cell module to the storage battery.

15. A control method of a fuel cell system having a fuel cell module configured to generate power by using gas supplied via a gas meter, the fuel cell system causes a gas leakage detection system to determine that there is no gas leakage by stopping gas supply via the gas meter for a second predetermined period of time within a predetermined number of days, the control method comprising the steps of:
  detecting for a first predetermined period of time that the gas is not supplied to anything else other than the fuel cell module;
  raising or maintaining temperature of the fuel cell module, when detecting for the first predetermined period of time that the gas is not supplied to anything else other than the fuel cell module;
  controlling to stop power generation of the fuel cell module for the second predetermined period of time, when the fuel cell module is maintained at predetermined temperature or higher; and
  starting the power generation by the fuel cell module, when the fuel cell system is stopped for a third predetermined period of time, the third predetermined period of time is a maximum period of time that allows the fuel cell system to stop the gas supply so as to be in a standby state.

16. The control method of the fuel cell system according to claim 15, comprising the steps of:
  detecting that the gas is not supplied while the power generation is stopped for the second predetermined period of time; and
  starting measurement of a second predetermined period of time anew when the gas is supplied during the second predetermined period of time.

17. A fuel cell control apparatus configured to control power generation of a fuel cell module that generates power by using gas supplied via a gas meter, the fuel cell control apparatus causes a gas leakage detection system to determine that there is no gas leakage by stopping gas supply via the gas meter for a second predetermined period of time within a predetermined number of days,
  wherein the fuel cell control apparatus controls to raise or maintain temperature of the fuel cell module when detecting for a first predetermined period of time that the gas is not supplied to anything else other than the fuel cell module,
  wherein the fuel cell control apparatus controls to stop the power generation of the fuel cell module for the second predetermined period of time when the fuel cell module is maintained at predetermined temperature or higher, and
  wherein the fuel cell control apparatus controls the fuel cell module to start the power generation when the fuel cell system is stopped for a third predetermined period of time, the third predetermined period of time is a maximum period of time that allows the fuel cell system to stop the gas supply so as to be in a standby state.

18. The fuel cell control apparatus according to claim 17, detecting that the gas is not supplied while the power generation is stopped for the second predetermined period of time, when the gas is supplied during the second predetermined period of time, controlling to start measurement of a second predetermined period of time anew.

\* \* \* \* \*